United States Patent
Kirihara et al.

(10) Patent No.: US 12,533,751 B2
(45) Date of Patent: Jan. 27, 2026

(54) LASER PROCESSING APPARATUS AND LASER PROCESSING METHOD

(71) Applicant: DISCO CORPORATION, Tokyo (JP)

(72) Inventors: Naotoshi Kirihara, Tokyo (JP); Hiroshi Morikazu, Tokyo (JP); Yohei Kaneko, Tokyo (JP); Kentaro Odanaka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 133 days.

(21) Appl. No.: 18/490,136

(22) Filed: Oct. 19, 2023

(65) Prior Publication Data

US 2024/0131629 A1 Apr. 25, 2024
US 2024/0227083 A9 Jul. 11, 2024

(30) Foreign Application Priority Data

Oct. 21, 2022 (JP) ................. 2022-168934

(51) Int. Cl.
*B23K 26/40* (2014.01)
*B23K 26/364* (2014.01)
*H01L 21/268* (2006.01)

(52) U.S. Cl.
CPC ............ *B23K 26/40* (2013.01); *B23K 26/364* (2015.10); *H01L 21/268* (2013.01)

(58) Field of Classification Search
None
See application file for complete search history.

(56) References Cited

U.S. PATENT DOCUMENTS

2007/0228023 A1* 10/2007 Kleine ............... B23K 26/0823
219/121.72
2018/0257171 A1* 9/2018 Morikazu .......... B23K 26/0853

FOREIGN PATENT DOCUMENTS

JP 2015133437 A * 7/2015

* cited by examiner

*Primary Examiner* — Farah Taufiq
(74) *Attorney, Agent, or Firm* — GREER BURNS & CRAIN, LTD.

(57) ABSTRACT

A laser beam irradiating unit of a laser processing apparatus includes a laser oscillating mechanism. The laser oscillating mechanism includes a group setting unit configured to, on a condition that a pulsed laser beam is applied at shorter time intervals than a length of time that molten debris is generated, set the number of pulsed laser beams to be applied until a time that the molten debris is solidified and set the number of pulsed laser beams as one group. A time interval setting unit is configured to set a time until heat generated by application of the pulsed laser beams of the one group is cooled, which serves as a time interval between the one group and an adjacent group, and set time intervals of the pulsed laser beams constituting the one group. The laser oscillating mechanism sets a repetition frequency with the one group as one unit.

5 Claims, 5 Drawing Sheets

LASER PROCESSING APPARATUS AND LASER PROCESSING METHOD

BACKGROUND OF THE INVENTION

Field of the Invention

The present invention relates to a laser processing apparatus and a laser processing method for processing a workpiece.

Description of the Related Art

A wafer having a plurality of devices such as integrated circuits (ICs) or large-scale integration (LSI) circuits formed on a top surface thereof in such a manner as to be demarcated by a plurality of intersecting planned dividing lines is divided into individual device chips by a laser processing apparatus. Each of the divided device chips is used in an electric apparatus such as a mobile telephone or a personal computer.

The laser processing apparatus includes a chuck table that holds a workpiece; a laser beam irradiating unit that applies a pulsed laser beam having a wavelength absorbable by the workpiece held on the chuck table; and a feed mechanism that processing-feeds the chuck table and the laser beam irradiating unit relative to each other. The laser processing apparatus can divide the wafer into individual device chips with high accuracy.

However, there is a problem in that molten debris produced by the application of the pulsed laser beam adheres to the devices and degrades the quality of the device chips.

Accordingly, the present applicant has developed a technology that applies the pulsed laser beam again in order to remove the molten debris formed on the peripheries of the device chips (see Japanese Patent Laid-open No. 2015-133437, for example).

SUMMARY OF THE INVENTION

However, the technology disclosed in Japanese Patent Laid-open No. 2015-133437 necessitates the application of the pulsed laser beam for removing the molten debris after the application of the pulsed laser beam for forming grooves in the workpiece. There is thus room for improvement in productivity.

It is accordingly an object of the present invention to provide a laser processing apparatus and a laser processing method that can simultaneously perform the application of a pulsed laser beam for forming grooves in a workpiece and the application of the pulsed laser beam for suppressing the generation of molten debris.

In accordance with an aspect of the present invention, there is provided a laser processing apparatus including a chuck table configured to hold a workpiece, a laser beam irradiating unit configured to irradiate the workpiece held on the chuck table with a pulsed laser beam, and a feed mechanism configured to processing-feed the chuck table and the laser beam irradiating unit relative to each other, the laser beam irradiating unit including a laser oscillating mechanism configured to emit the pulsed laser beam and a condenser configured to condense the pulsed laser beam emitted by the laser oscillating mechanism and irradiate the workpiece held on the chuck table with the condensed pulsed laser beam, the laser oscillating mechanism including a group setting unit configured to, on a condition that the pulsed laser beam is applied at shorter time intervals than a length of time that molten debris is generated by irradiation of the workpiece with the pulsed laser beam, set the number of pulsed laser beams to be applied until a time that the molten debris is solidified and set the number of pulsed laser beams as one group, and a time interval setting unit configured to set a time until heat generated by application of the pulsed laser beams of the one group is cooled serves as a time interval between the one group and an adjacent group, and set time intervals of the pulsed laser beams constituting the one group, and the laser oscillating mechanism being configured to set a repetition frequency with the one group as one unit.

Preferably, the laser oscillating mechanism includes a plurality of laser diodes configured to emit the pulsed laser beams, the group setting unit sets the one group by the pulsed laser beams emitted by the plurality of laser diodes, and the time interval setting unit inputs signals to the plurality of laser diodes at desired time intervals through a pulse delay generator and inputs the signals such that the time until the heat generated by the application of the pulsed laser beams of the one group is cooled serves as the time interval between the one group and the adjacent group.

Preferably, the laser oscillating mechanism includes a plurality of laser oscillators configured to emit the pulsed laser beams, the group setting unit sets the one group by the pulsed laser beams emitted by the plurality of laser oscillators, and the time interval setting unit applies voltages to the plurality of laser oscillators at desired time intervals through a voltage delay unit and applies the voltages such that the time until the heat generated by the application of the pulsed laser beams of the one group is cooled serves as the time interval between the one group and the adjacent group.

Preferably, the repetition frequency is set by thinning out a predetermined number of groups from a plurality of groups to be emitted during one second.

In accordance with another aspect of the present invention, there is provided a laser processing method for processing a workpiece by using a laser processing apparatus, the laser processing apparatus including a laser oscillating mechanism, the laser oscillating mechanism including a group setting unit configured to set a plurality of pulsed laser beams as one group and a time interval setting unit configured to set time intervals of the pulsed laser beams constituting the one group, the laser oscillating mechanism being configured to set a repetition frequency with the one group as one unit, the laser processing method including a groove forming step of forming a groove through ablation processing by irradiating the workpiece with the pulsed laser beams, and a molten debris suppressing step of suppressing generation of molten debris in the groove forming step, in order to perform the molten debris suppressing step simultaneously at a time of the groove forming step, the group setting unit setting the number of the pulsed laser beams of the one group to be applied until a time that the molten debris is solidified, on a condition that the pulsed laser beams are applied at shorter time intervals than a length of time that the molten debris is generated by irradiation of the workpiece with the pulsed laser beams, and the time interval setting unit setting a time until heat generated by application of the pulsed laser beams of the one group is cooled serves as a time interval between the one group and an adjacent group, and setting the time intervals of the pulsed laser beams constituting the one group.

Preferably, in a case where the molten debris is generated at time t1 after irradiation of the workpiece with a first pulsed laser beam and the molten debris is solidified at time t2, the time interval setting unit sets the time intervals t3 of the pulsed laser beams of the one group to t3<t1, and the group setting unit sets the number n of the pulsed laser beams of the one group to n=Integer Part of (t2/t3)+1.

According to the present invention, it is possible to simultaneously perform the application of the pulsed laser beam for forming grooves in the workpiece and the application of the pulsed laser beam for suppressing the generation of molten debris. Consequently, productivity can be improved.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A laser processing apparatus and a laser processing method according to an embodiment of the present invention will hereinafter be described with reference to the drawings.

The laser processing apparatus according to the present invention will first be described. The laser processing apparatus indicated in entirety by a reference sign 2 in FIG. 1 includes a holding unit 4 that holds a workpiece such as a wafer, a laser beam irradiating unit 6 that irradiates the workpiece held by the holding unit 4 with a pulsed laser beam, and a feed mechanism 8 that processing-feeds the holding unit 4 and the laser beam irradiating unit 6 relative to each other.

Figure 1:
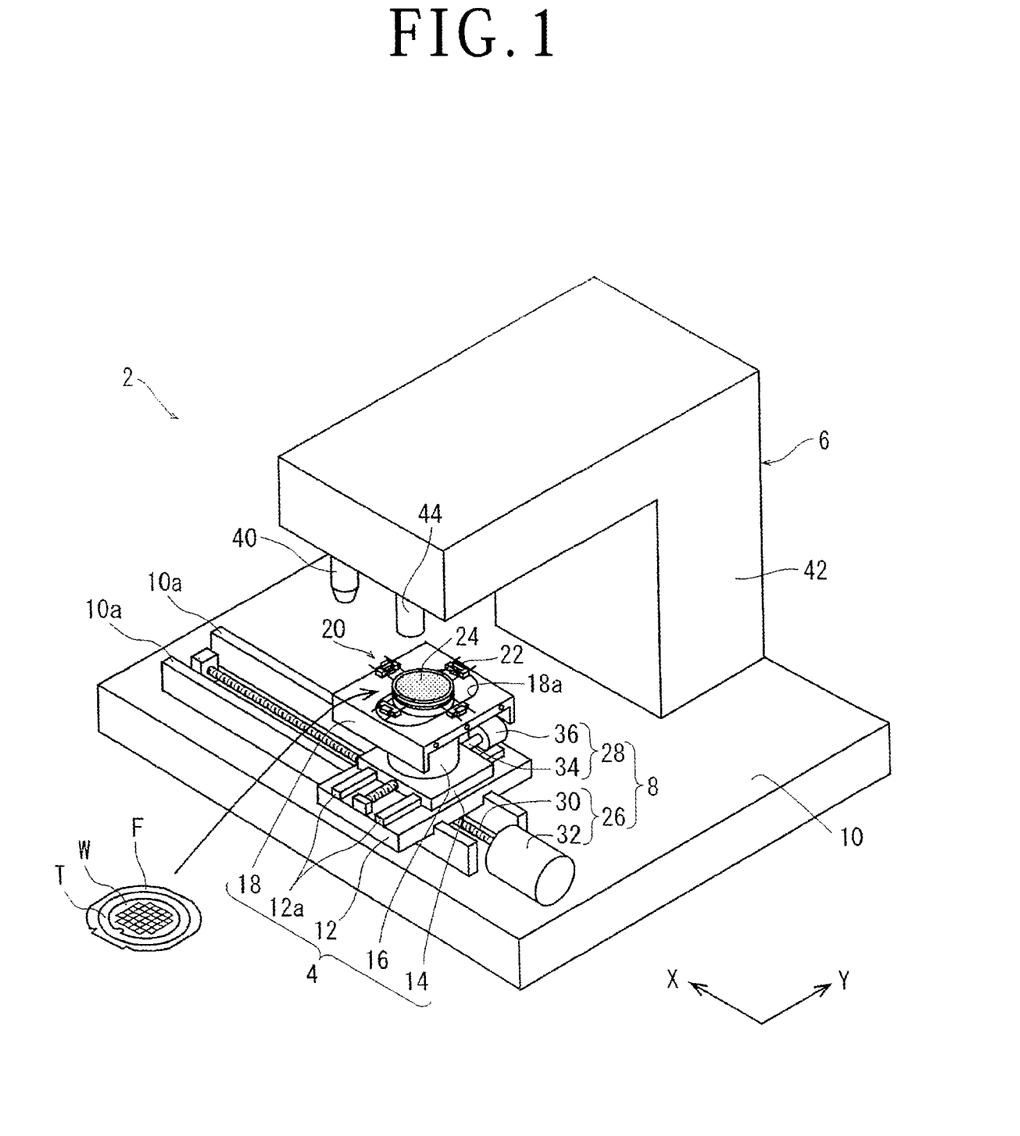
FIG. 1 is a perspective view of a laser processing apparatus according to an embodiment of the present invention.

As illustrated in FIG. 1, the holding unit 4 includes an X-axis movable plate 12 supported by the upper surface of a base 10 in such a manner as to be movable in an X-axis direction, a Y-axis movable plate 14 supported by the upper surface of the X-axis movable plate 12 in such a manner as to be movable in a Y-axis direction, a column support 16 fixed on the upper surface of the Y-axis movable plate 14, and a cover plate 18 fitted to an upper end of the column support 16. An elongate hole 18a that extends in the Y-axis direction is formed in the cover plate 18. A chuck table 20 that extends upward through the elongate hole 18a is rotatably fitted to the upper end of the column support 16. A plurality of clamps 22 are arranged at intervals in a circumferential direction on the periphery of the chuck table 20.

An upper end part of the chuck table 20 is provided with a circular porous suction chuck 24 connected to suction means (not illustrated). In the holding unit 4, the workpiece is held under suction by a suction force being generated on the upper surface of the suction chuck 24 by the suction means. In addition, the chuck table 20 is rotated with an upward-downward direction as an axis thereof by a motor (not illustrated) included in the column support 16.

Incidentally, the X-axis direction is a direction indicated by an arrow X in FIG. 1, and the Y-axis direction is a direction indicated by an arrow Y in FIG. 1 and is a direction orthogonal to the X-axis direction. An XY plane defined by the X-axis direction and the Y-axis direction is substantially horizontal.

The feed mechanism 8 according to the present embodiment includes an X-axis feed mechanism 26 that processing-feeds the chuck table 20 in the X-axis direction and a Y-axis feed mechanism 28 that indexing-feeds the chuck table 20 in the Y-axis direction.

The X-axis feed mechanism 26 includes a ball screw 30 connected to the X-axis movable plate 12 and extending in the X-axis direction and a motor 32 that rotates the ball screw 30. The X-axis feed mechanism 26 converts rotary motion of the motor 32 into rectilinear motion by the ball screw 30 and transmits the rectilinear motion to the X-axis movable plate 12. The X-axis feed mechanism 26 thereby moves the X-axis movable plate 12 in the X-axis direction along guide rails 10a on the base 10. Consequently, the chuck table 20 is processing-fed in the X-axis direction.

The Y-axis feed mechanism 28 includes a ball screw 34 connected to the Y-axis movable plate 14 and extending in the Y-axis direction and a motor 36 that rotates the ball screw 34. The Y-axis feed mechanism 28 converts rotary motion of the motor 36 into rectilinear motion by the ball screw 34 and transmits the rectilinear motion to the Y-axis movable plate 14. The Y-axis feed mechanism 28 thereby moves the Y-axis movable plate 14 in the Y-axis direction along guide rails 12a on the X-axis movable plate 12. Consequently, the chuck table 20 is indexing-fed in the Y-axis direction.

Described with reference to FIG. 1 and FIG. 2, the laser beam irradiating unit 6 includes a laser oscillating mechanism 38 that emits a pulsed laser beam (see FIG. 2), and a condenser 40 that condenses the pulsed laser beam emitted by the laser oscillating mechanism 38 and irradiates the workpiece held by the holding unit 4 with the condensed pulsed laser beam.

As illustrated in FIG. 1, the laser beam irradiating unit 6 has a housing 42 that extends upward from the upper surface of the base 10, and then extends substantially horizontally. The laser oscillating mechanism 38 is housed within the housing 42. The condenser 40 is fitted to the lower surface of a distal end of the housing 42. In addition, an imaging unit 44 for imaging the workpiece held by the holding unit 4 is attached to the lower surface of the distal end of the housing 42.

Figure 2:
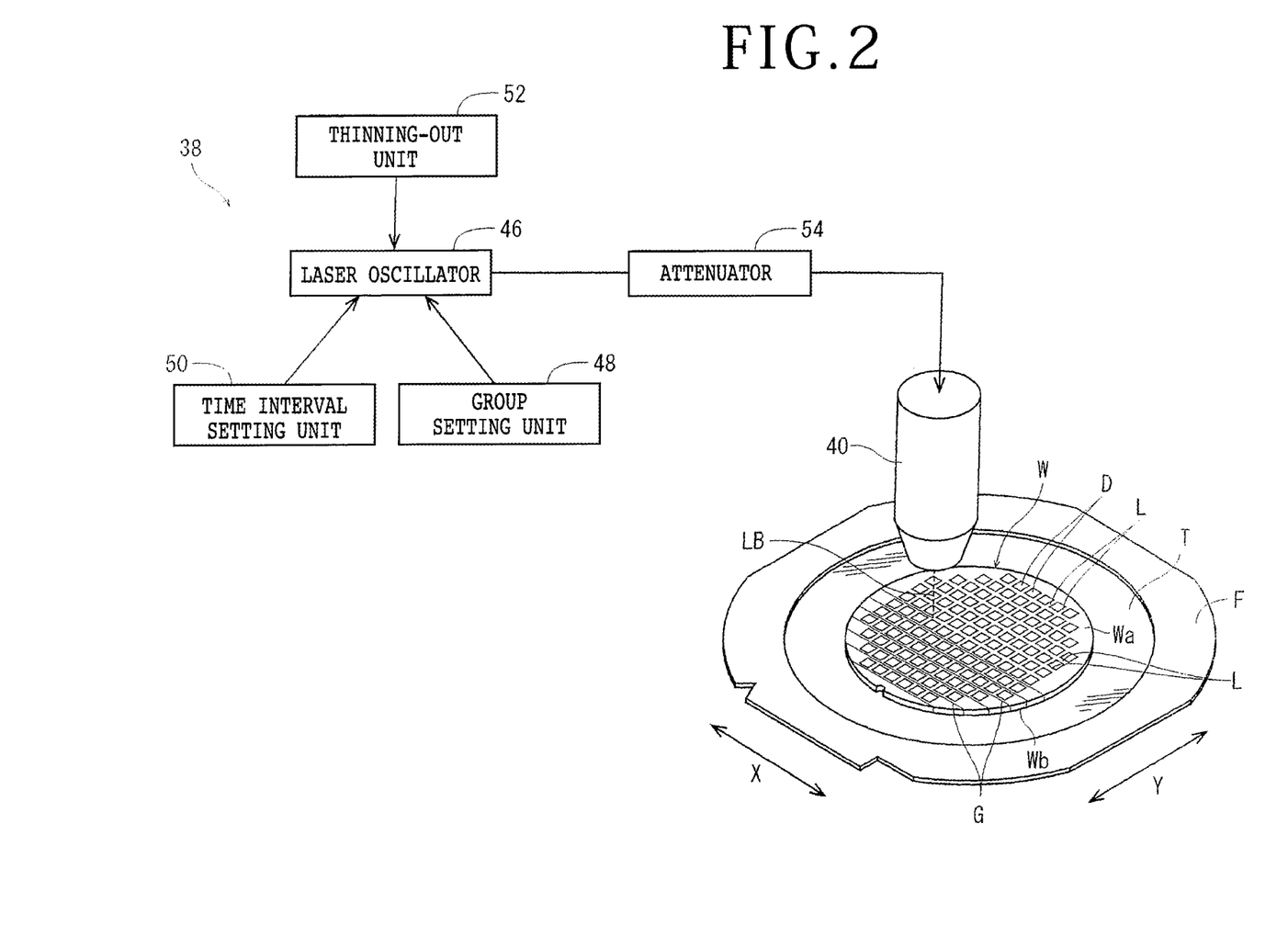
FIG. 2 is a block diagram of the laser processing apparatus illustrated in FIG. 1.

As illustrated in FIG. 2, the laser oscillating mechanism 38 includes a laser oscillator 46 that emits the pulsed laser beam having a wavelength absorbable by the workpiece, a group setting unit 48, a time interval setting unit 50, and an attenuator 54 that adjusts the power of the pulsed laser beam emitted by the laser oscillator 46. The laser oscillating mechanism 38 sets a repetition frequency with one group as one unit.

Figure 3:
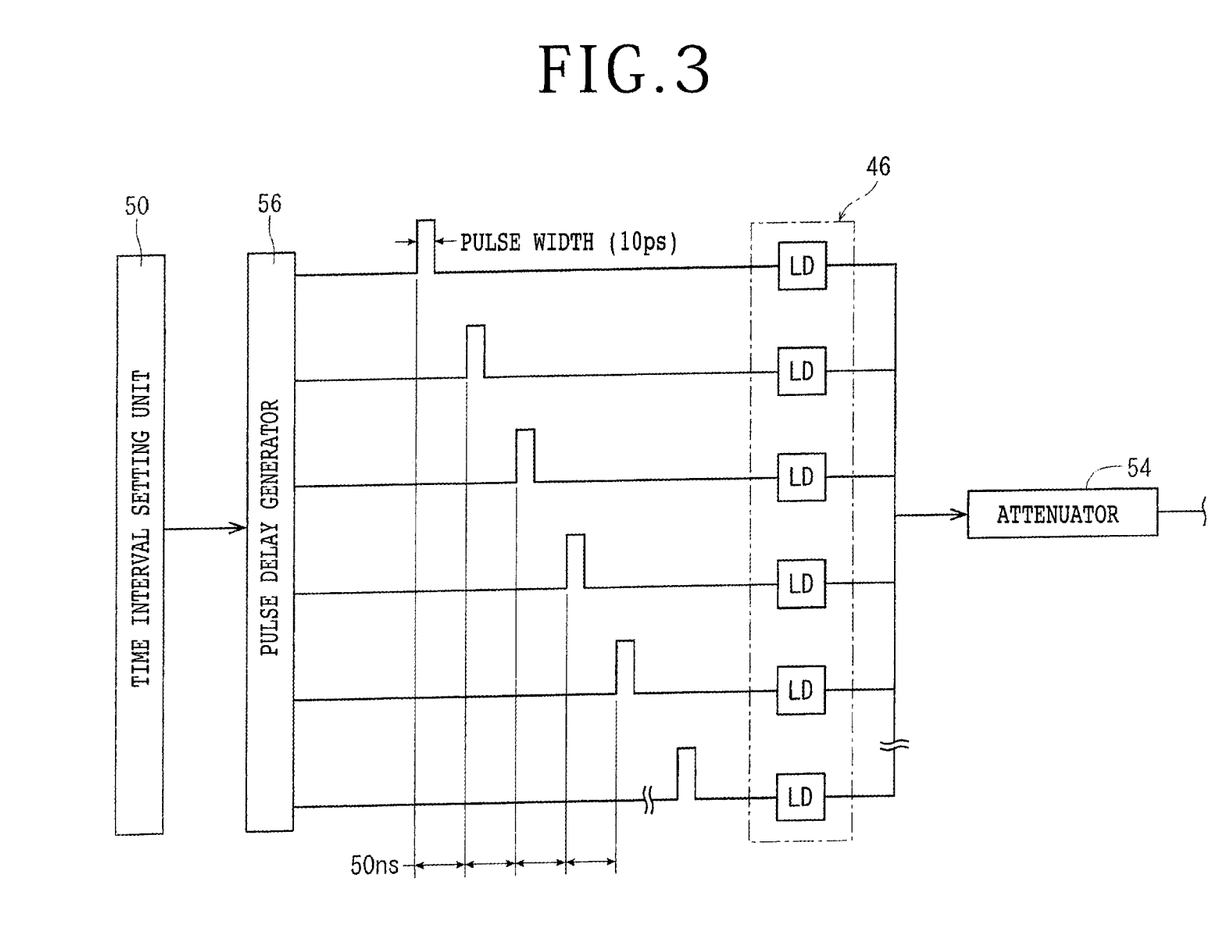
FIG. 3 is a schematic diagram of a laser oscillating mechanism illustrated in FIG. 2.
Figure 4:
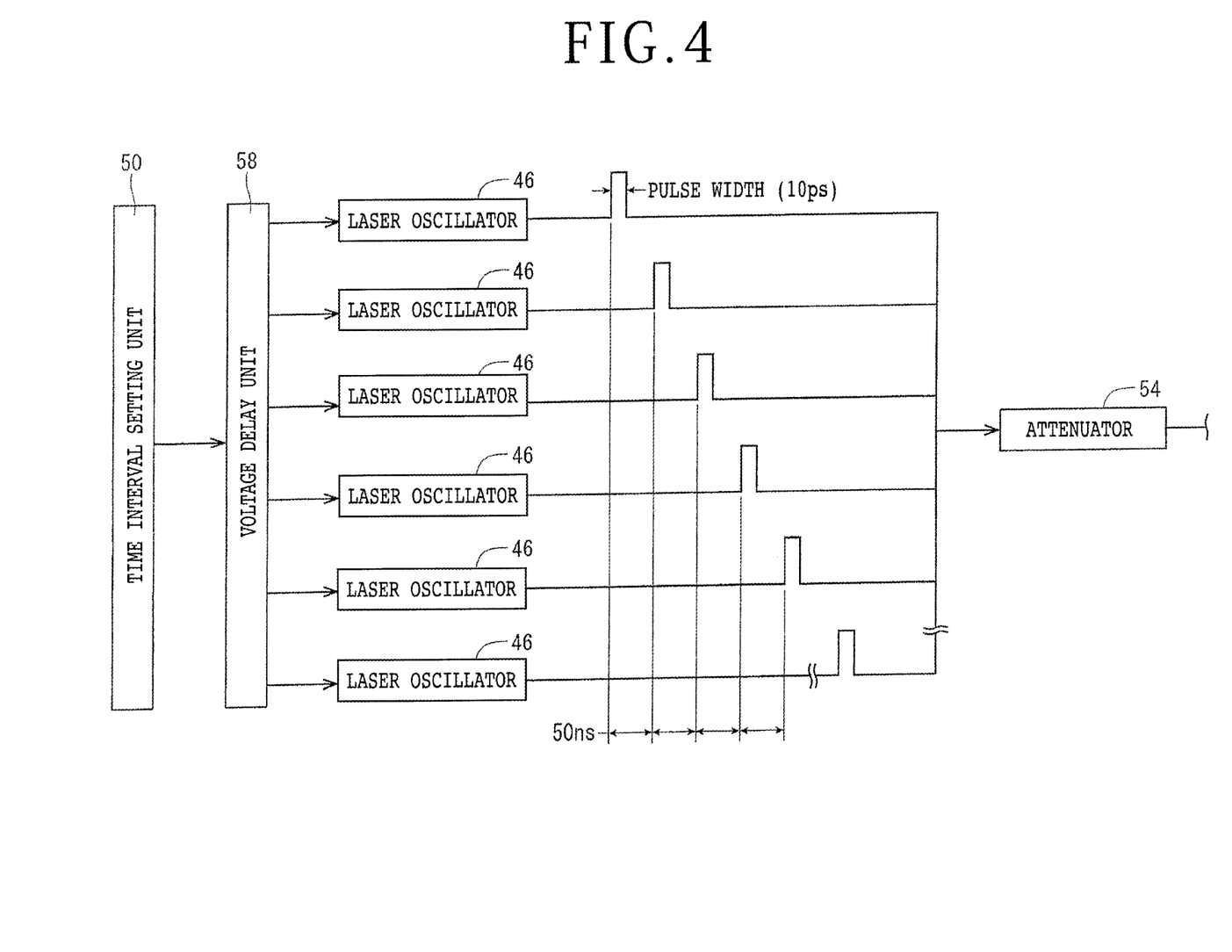
FIG. 4 is a schematic diagram of the laser oscillating mechanism in another form.

FIG. 2 depicts one box representing the laser oscillator 46. However, the quantity of laser oscillators 46 provided to the laser oscillating mechanism 38 may be one or plural. In a case where one laser oscillator 46 is provided, the one laser oscillator 46 can include a plurality of laser diodes LD, as illustrated in FIG. 3, for example. In addition, as illustrated in FIG. 4, the laser oscillating mechanism 38 may be provided with a plurality of laser oscillators 46. A laser medium is not limited to a semiconductor, and another publicly known medium (for example, gas) can be adopted as the laser medium.

On a condition that the pulsed laser beam is applied at shorter time intervals than a length of time that molten debris is generated by the irradiation of the workpiece with the pulsed laser beam, the group setting unit 48 sets the number of pulsed laser beams to be applied until a time that the molten debris is solidified, and sets the number of pulsed laser beams as one group.

The applicant has confirmed that the molten debris which is generated when the workpiece is irradiated with a pulsed laser beam occurs after the passage of approximately 100 ns from the irradiation of the workpiece with the pulsed laser beam and is solidified after the passage of approximately 500 ns from the irradiation of the workpiece with the pulsed laser beam.

Therefore, on a condition that the pulsed laser beam is applied at shorter time intervals (pulse intervals) than 100 ns, the group setting unit 48 according to the present embodiment sets the number of pulsed laser beams to be applied until the passage of 500 ns from the application of a first pulsed laser beam (first pulse), and sets the number of pulsed laser beams as the one group. By thus setting the number of pulsed laser beams, it is possible to suppress the generation of the molten debris when the workpiece is irradiated with the pulsed laser beams.

As in an example illustrated in FIG. 3, the group setting unit 48 can set the one group by pulsed laser beams emitted by a plurality of (for example, 11) laser diodes LD. Incidentally, the group setting unit 48 may set the one group by pulsed laser beams emitted by some of laser diodes LD (for example, 11 of 15 laser diodes LD) included in the laser oscillator 46.

In addition, as in an example illustrated in FIG. 4, the group setting unit 48 can also set the one group by pulsed laser beams emitted by a plurality of laser oscillators 46. Incidentally, the group setting unit 48 may set the one group by pulsed laser beams emitted by some of laser oscillators 46 provided to the laser oscillating mechanism 38.

The time interval setting unit 50 sets a time until heat generated by the application of the pulsed laser beams of the one group is cooled serves as a time interval between the one group and an adjacent group, and sets the time intervals of the pulsed laser beams constituting the one group.

Figure 5:
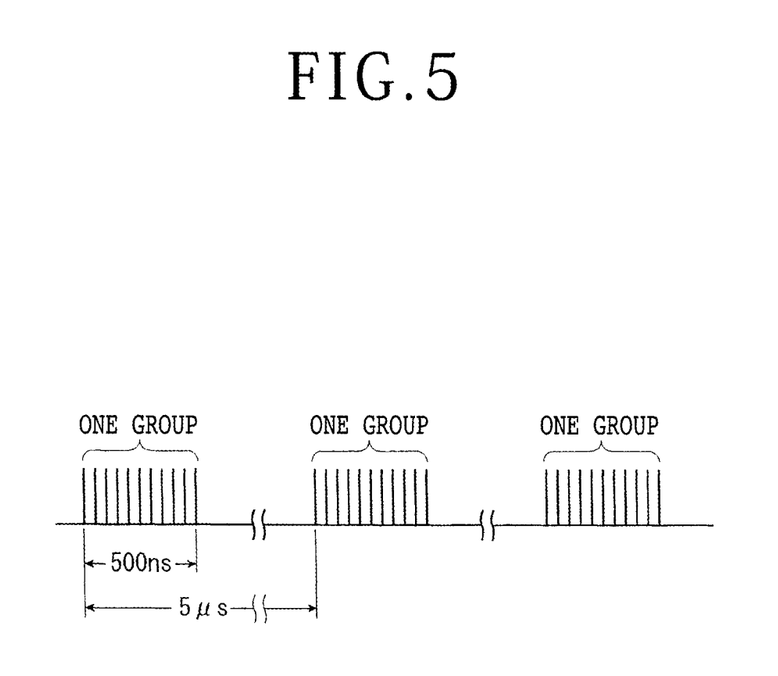
FIG. 5 is a schematic diagram of pulsed laser beams applied to a workpiece.

It is known that, when approximately 5 µs has passed from the irradiation of the workpiece formed of a semiconductor material such as silicon with a pulsed laser beam, heat generated in the workpiece by the application of the pulsed laser beam is cooled, and the temperature of the workpiece is lowered to substantially the same temperature as before the application of the pulsed laser beam. Therefore, as illustrated in FIG. 5, the time interval setting unit 50 sets the time interval between the one group and the adjacent group at 5 µs or more.

Thus, the heat generated in the workpiece is cooled before the application of the pulsed laser beams of a next group after the irradiation of the workpiece with the pulsed laser beams of the one group. A degradation in quality of devices due to the heat can be consequently prevented.

In addition, the time interval setting unit 50 sets the time intervals of the pulsed laser beams constituting the one group. Then, in a case illustrated in FIG. 3, the time interval setting unit 50 inputs signals to the plurality of laser diodes LD at desired time intervals (50 ns in the example illustrated in the figure) through a pulse delay generator 56 and inputs the signals such that the time until heat generated by the application of the pulsed laser beams of the one group is cooled is the time interval between the one group and the adjacent group (5 µs in the above-described example). An optional value (for example, 10 ps) can be adopted as the pulse width of the signals input from the pulse delay generator 56 to the respective laser diodes LD.

On the other hand, in the case illustrated in FIG. 4, the time interval setting unit 50 applies voltages to the plurality of laser oscillators 46 after delaying the voltages by a desired time (50 ns in the example illustrated in the figure) through a voltage delay unit 58, and applies the voltages such that the time until heat generated by the application of the pulsed laser beams of the one group is cooled is a time interval between the one group and the adjacent group. The pulse width of the pulsed laser beams emitted by the respective laser oscillators 46 as a result of the application of the voltages from the voltage delay unit 58 to the respective laser oscillators 46 may be an optional value (for example, 10 ps).

Then, when the signals are input to the plurality of laser diodes LD by the pulse delay generator 56 or when the voltages are applied to the plurality of laser oscillators 46 by the voltage delay unit 58, as described above, pulsed laser beams are generated such that the one group (for example, 11 pulses) has a predetermined time interval (5 µs in the example illustrated in the figure) with respect to another group, as illustrated in FIG. 5. That is, the repetition frequency of the pulsed laser beams is set with the one group (11 pulses) as one unit. In a case where the time interval between the groups is 5 µs as in the example illustrated in the figure, the repetition frequency is 200 kHz.

Then, the pulsed laser beams in which the groups have a predetermined time interval with respect to each other are adjusted in power by the attenuator 54, are thereafter condensed by the condenser 40, and then are applied to the workpiece. Incidentally, light guiding means such as an optical fiber is provided between the laser oscillator 46 and the attenuator 54, so that the pulsed laser beams of the one group are guided from the laser oscillator 46 to the attenuator 54.

While the time interval between the groups (5 µs in the example illustrated in the figure) may be set by the time interval setting unit 50, as described above, a thinning-out unit 52 (see FIG. 2) that thins out a predetermined number of groups from a plurality of groups emitted by the laser oscillator 46 during one second may set the time interval between the groups. The thinning-out unit 52 can be constituted by an acousto-optic element or an electro-optic element.

That is, the one group is set by the pulsed laser beams emitted from the plurality of laser diodes LD in the example illustrated in FIG. 3 or the plurality of laser oscillators 46 in the example illustrated in FIG. 4. Moreover, in both of the examples illustrated in FIG. 3 and FIG. 4, the pulsed laser beams such that the groups have a predetermined time interval with respect to each other can be generated by the thinning-out unit 52 by thinning out a predetermined number of groups from a plurality of groups emitted by the plurality of laser diodes LD or the plurality of laser oscillators 46 during one second with the one group as one unit.

FIG. 2 illustrates also a wafer W as the workpiece that can be subjected to processing by the laser processing apparatus 2. The wafer W in a disk shape can be formed of an appropriate semiconductor material such as silicon. A top surface Wa of the wafer W is demarcated into a plurality of rectangular regions by planned dividing lines L in a lattice shape. A device D such as an IC or an LSI circuit is formed in each of the plurality of rectangular regions. Though not illustrated in the figure, the top surface Wa of the wafer W is coated with a metallic film of copper or the like.

In the present embodiment, an undersurface Wb of the wafer W is affixed to an adhesive tape T fixed to an annular frame F. However, the top surface Wa of the wafer W may be affixed to the adhesive tape T.

The laser processing method according to the present invention will next be described.

In the present embodiment, a preparing step is first performed which prepares the laser processing apparatus (for example, the above-described laser processing apparatus 2) that applies the pulsed laser beam having a wavelength absorbable by the wafer W.

After the preparing step is performed, a groove forming step is performed which forms grooves through ablation processing by irradiating the wafer W with the pulsed laser beam.

In the groove forming step, first, the wafer W is held under suction on the upper surface of the chuck table 20 with the top surface Wa of the wafer W oriented upward. In addition, the annular frame F is fixed by the clamps 22. Next, the wafer W is imaged by the imaging unit 44, and a planned dividing line L extending in a first direction is aligned with the X-axis direction on the basis of the image of the wafer W imaged by the imaging unit 44. In addition, the pulsed laser beam is focused on the planned dividing line L aligned with the X-axis direction, and the height of a condensing point of the pulsed laser beam is adjusted to the top surface Wa of the wafer W.

Next, while the chuck table 20 is processing-fed in the X-axis direction, ablation processing is performed along the planned dividing line L by applying the pulsed laser beam LB having a wavelength absorbable by the wafer W from the condenser 40 to the wafer W. Consequently, a groove G (see FIG. 2) that severs the planned dividing line L is formed.

Next, the chuck table 20 is indexing-fed in the Y-axis direction with respect to the condenser 40 by an amount corresponding to an interval in the Y-axis direction of the planned dividing line L. Then, grooves G are formed in all of the planned dividing lines L aligned with the X-axis direction by alternately repeating the application of the pulsed laser beam and the indexing feed.

Further, in all of the planned dividing lines L extending in a second direction orthogonal to the planned dividing lines L in which the grooves G have previously been formed, grooves G are formed by alternately repeating the application of the pulsed laser beam and the indexing feed after rotating the chuck table 20 by 90 degrees. The grooves G are formed in a lattice manner along the planned dividing lines L in a lattice shape by thus performing the groove forming step. Consequently, the wafer W can be divided into individual device chips.

(Molten Debris Suppressing Step)

At a time of the groove forming step, a molten debris suppressing step of suppressing the generation of molten debris in the groove forming step is performed at the same time.

To this end, in the molten debris suppressing step, the group setting unit 48 sets the number of pulsed laser beams of the one group to be applied until a time that the molten debris is solidified, on a condition that the pulsed laser beams are applied at shorter time intervals than a length of time that the molten debris is generated by the irradiation of the workpiece with a pulsed laser beam, and the time interval setting unit 50 sets a time until heat generated by the application of the pulsed laser beams of the one group is cooled serves as a time interval between the one group and the adjacent group and sets the time intervals of the pulsed laser beams constituting the one group.

(Pulse Intervals and Number of Pulses)

Description will be made of the time intervals (pulse intervals) of the pulsed laser beams constituting the one group and the number of pulsed laser beams (number of pulses) of the one group. In a case where the molten debris occurs at time t1 after the irradiation of the workpiece with a pulsed laser beam and the molten debris is solidified at time t2, the time interval setting unit 50 sets the time intervals (pulse intervals) t3 of the pulsed laser beams of the one group to t3<t1, and the group setting unit 48 sets the number (number of pulses) n of the pulsed laser beams of the one group to n=Integer Part of (t2/t3)+1.

As described above, it has been confirmed that the molten debris, which is generated when the workpiece is irradiated with a pulsed laser beam, occurs after the passage of approximately 100 ns from the irradiation of the workpiece with the pulsed laser beam and is solidified after the passage of approximately 500 ns from the irradiation of the workpiece with the pulsed laser beam.

Accordingly, supposing that a time that a first pulsed laser beam (first pulse) is applied to the workpiece is a reference (0s), time t1 at which the molten debris is generated is set to be t1=100 ns, and time t2 at which the molten debris is solidified is set to be t2=500 ns. In such a case, the time interval setting unit 50 sets the time intervals (pulse intervals) t3 of the pulsed laser beams of the one group to 50 ns, for example. However, t3 is not limited to 50 ns, but it suffices for t3 to be a time shorter than time t1=100 ns at which the molten debris is generated.

When the time interval setting unit 50 sets the pulse intervals t3 at 50 ns, the group setting unit 48 sets, as the number n of pulsed laser beams (number of pulses) of the one group, n=Integer Part of (t2/t3)+1
=Integer Part of (500 ns/50 ns)+1
=10+1
=11

In the above-described case, (t2/t3) is a combination of a divisible numerical value. However, in a case where the time interval setting unit 50 sets t3=60 ns, for example, the group setting unit 48 sets, as the number of pulses n, n=Integer Part of (t2/t3)+1
=Integer Part of (500 ns/60 ns)+1
=Integer Part of (8.333 . . . )+1
=8+1
=9

Thus, on a condition that the pulsed laser beam is applied at shorter time intervals (t3=50 ns) than a length of time (t1=100 ns) that the molten debris is generated by the irradiation of the workpiece with the pulsed laser beam, the group setting unit 48 sets the number (n=11) of pulsed laser beams of the one group to be applied until the time (t2=500 ns) that the molten debris is solidified after the application of the first pulsed laser beam (first pulse). It is thereby possible to suppress the generation of the molten debris when the workpiece is irradiated with the pulsed laser beam.

(Time Interval Between Groups)

As described above, the time interval setting unit 50 not only sets the time intervals (50 ns in the above-described example) of the pulsed laser beams constituting the one group but also sets a time until heat generated by the application of the pulsed laser beams of the one group is cooled serves as a time interval between the one group and the adjacent group. This is because, when the wafer W continues to be irradiated with the pulsed laser beam, heat accumulation occurs in the wafer W, and there is a fear of an adverse effect on the devices (degradation in quality of the devices) due to the heat.

As described above, it is known that, when approximately 5 μs has passed from the irradiation of the workpiece formed of a semiconductor material such as silicon with a pulsed laser beam, the heat generated in the workpiece by the application of the pulsed laser beam is cooled, and the temperature of the workpiece is lowered to substantially the same temperature as before the application of the pulsed laser beam. Therefore, as illustrated in FIG. 5, the time interval setting unit 50 sets the time interval between the one group and the adjacent group at 5 μs or more.

Thus, the heat generated in the wafer W is cooled before the application of the pulsed laser beams of a next group after the irradiation of the wafer W with the pulsed laser beams of the one group. An adverse effect on the devices due to the heat can be consequently prevented.

Incidentally, it is preferable that the number of pulsed laser beams constituting the one group be set by the group setting unit 48 in such a manner as to attain a temperature equal to or lower than a temperature of a level at which the heat generated by the application of the pulsed laser beams of the one group does not adversely affect the devices.

After the group setting unit 48 sets the number (n=11) of pulsed laser beams of the one group and the time interval setting unit 50 sets the time interval (5 μs) between the groups and the time intervals (t3=50 ns) of the pulsed laser beams constituting the one group, as described above, the time interval setting unit 50 inputs signals to the plurality of laser diodes LD at intervals of 50 ns through the pulse delay generator 56 and inputs the signals such that the time interval between the groups is 5 μs (see FIG. 3).

Alternatively, the time interval setting unit 50 may apply voltages to the plurality of laser oscillators 46 at intervals of 50 ns through the voltage delay unit 58 and apply the voltages such that the time interval between the groups is 5 μs (see FIG. 4).

Incidentally, with regard to the time interval between the groups, the time interval between the groups may be set to be 5 μs by the thinning-out unit 52 by thinning out a predetermined number of groups from a plurality of groups to be emitted during one second.

That is, the time interval between the groups may be set to be 5 μs by the thinning-out unit 52 thinning out a predetermined number of groups from a plurality of groups to be emitted during one second while signals are input to the plurality of laser diodes LD at intervals of 50 ns via the pulse delay generator 56 or voltages are applied to the plurality of laser oscillators 46 at intervals of 50 ns via the voltage delay unit 58. Incidentally, in the case where the time interval between the groups is 5 μs, the repetition frequency is 200 kHz.

When the groove forming step and the molten debris suppressing step are thus performed at the same time, pulsed laser beams as illustrated in FIG. 5 are generated such that the number n of pulses of the one group is n=11, the pulse intervals t3 is 50 ns, and the time interval between the groups is 5 μs. The pulsed laser beams are adjusted in power by the attenuator 54 as appropriate, are thereafter condensed by the condenser 40, and are then applied along the planned dividing lines L of the wafer W. It is thereby possible to form the grooves G while suppressing the generation of the molten debris.

The groove forming step and the molten debris suppressing step can, for example, be performed under the following processing conditions.

Wavelength of pulsed laser beam: 355 nm
Average power: 30 W
Repetition frequency of one group: 200 kHz
Configuration of one group: 11 pulsed laser beams
Power density of one group: 30 J/cm 2
Pulse width of one group: 500 ns (see FIG. 5)
Spot size of one group: 10 μm in X-axis direction and 50 μm in Y-axis direction
Overlapping ratio between groups: 50%
Feed speed: 1 m/s
Time of generation of molten debris: generation after 100 ns following laser application
Time of solidification of molten debris: solidification after 500 ns following laser application
Power density of one pulse: 2.7 J/cm$^2$
Pulse width of one pulse: 10 ps
Overlapping ratio between pulses: 99.5%
Time interval between pulses: 50 ns (see FIG. 3 and FIG. 4)

Incidentally, the power density of a second and subsequent pulses among the pulses constituting the one group is preferably equal to or lower than the power density of the first pulse.

As described above, the present embodiment can simultaneously perform the application of the pulsed laser beam for forming grooves in the workpiece and the application of the pulsed laser beam for suppressing the generation of the molten debris. Hence, after the laser-processed grooves are formed, the pulsed laser beam does not need to be applied again in order to remove the molten debris, so that productivity can be improved. Further, the heat generated in the workpiece is cooled before the application of the pulsed laser beams of a next group after the irradiation of the workpiece with the pulsed laser beams of the one group. A degradation in quality of the devices due to the heat can be consequently prevented.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing method for processing a workpiece by using a laser processing apparatus, the laser processing apparatus including a laser oscillating mechanism, the laser oscillating mechanism including a group setting unit configured to set a plurality of pulsed laser beams as one group and a time interval setting unit configured to set time intervals of the pulsed laser beams constituting the one group, the laser oscillating mechanism being configured to set a repetition frequency with the one group as one unit, the laser processing method comprising:

a groove forming step of forming a groove through ablation processing by irradiating the workpiece with the pulsed laser beams; and a molten debris suppressing step of suppressing generation of molten debris in the groove forming step, in order to perform the molten debris suppressing step simultaneously at a time of the groove forming step, such that, during the molten debris suppressing step:

the group setting unit sets a number n of the pulsed laser beams of the one group to be applied until a time that the molten debris is solidified, on a condition that the pulsed laser beams are applied at shorter time intervals than a length of time that the molten debris is generated by irradiation of the workpiece with the pulsed laser beams, and the time interval setting unit sets a time until heat generated by application of the pulsed laser beams of the one group is cooled serves as a time interval between the one group and an adjacent group and setting the time intervals of the pulsed laser beams constituting the one group, wherein:

when the molten debris is generated at time t1 after irradiation of the workpiece with a first pulsed laser beam and the molten debris is solidified at time t2, the time interval setting unit sets the time intervals t3 of the pulsed laser beams of the one group such that t3 has a particular value which is greater than zero and less than t1, and the group setting unit sets the number n of the pulsed laser beams of the one group, such that the number n is calculated with the following formula:

n=Integer Part of (t2/t3)+1.

2. The laser processing method according to claim 1, wherein, t1 is set to be 100 ns, and t2 is set to 500 ns.

3. The laser processing method according to claim 2, wherein, t3 is set to 60 ns, and n=9.

4. The laser processing method according to claim 2, wherein, t3 is set to 50 ns, and n=11.

5. The laser processing method according to claim 1, wherein, the time interval between the one group and an adjacent group is generated by a thinning-out unit which thins out a predetermined number of the groups, wherein the thinning-out unit is constituted by an acousto-optic element or an electro-optic element.

* * * * *